(No Model.)

J. SHELLABARGER.
FLOOD GATE.

No. 457,623. Patented Aug. 11, 1891.

Witnesses
Geo. Freck
Roland A. Fitzgerald.

Inventor
J. Shellabarger,
per
Lehmann & Pattison,
atty.

UNITED STATES PATENT OFFICE.

JOSHUA SHELLABARGER, OF ROCKFORD, OHIO.

FLOOD-GATE.

SPECIFICATION forming part of Letters Patent No. 457,623, dated August 11, 1891.

Application filed April 21, 1891. Serial No. 389,831. (No model.)

*To all whom it may concern:*

Be it known that I, JOSHUA SHELLABARGER, a citizen of the United States, residing at Rockford, in the county of Mercer and State of Ohio, have invented certain new and useful Improvements in Flood-Gates; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in flood-gates; and it consists in the construction and arrangement of parts which will be fully described hereinafter, and particularly referred to in the claims.

The object of my invention is to produce a flood-gate which will readily rise with the water and allow the water and floating débris to pass freely through, and which will automatically return to position as soon as the waters subside.

Figure 1:
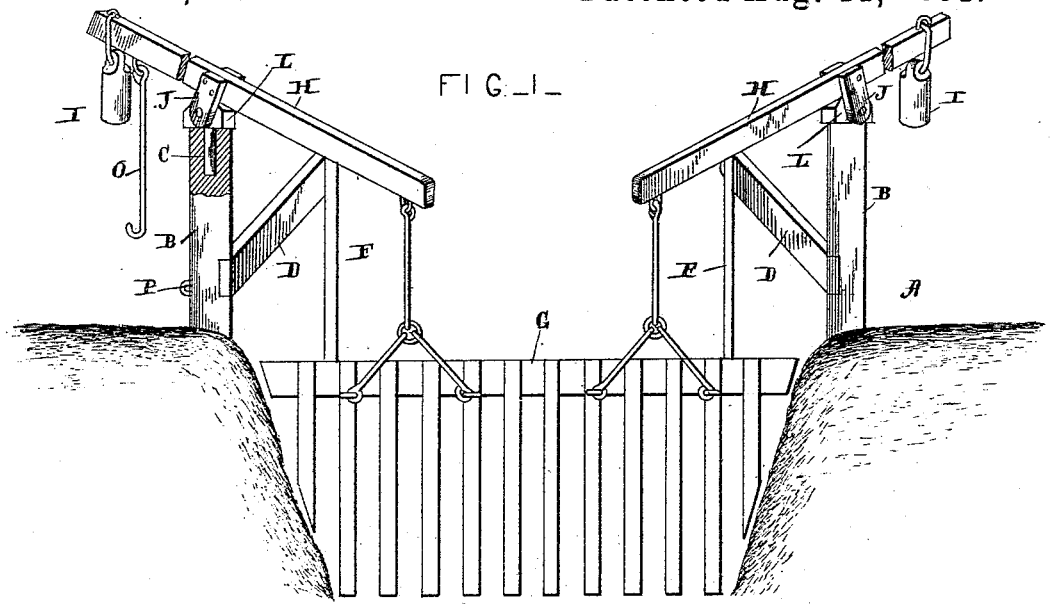
Figure 2:
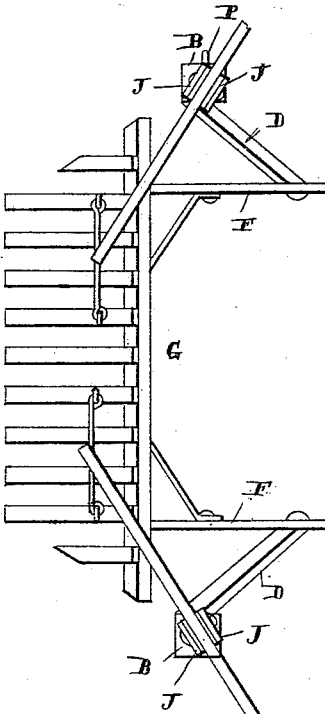

Figure 1 is a front view of a gate which embodies my invention. Fig. 2 is a plan view of the same.

B represents posts or uprights, which are placed upon opposite sides of a ditch or creek and have sockets C formed in their upper ends. Projecting inwardly at any desired angle from these supports B are the supports D, upon which are pivoted the rods F, which have the gate G rigidly secured to their lower ends. The gate G may be of any suitable construction, and is intended through the rods F to have a rising and falling movement, according to the height of the water in the ditch or creek, so that the floating logs in the ditch can pass freely under it. This gate is secured to the rods F and braced in any suitable manner.

Mounted upon the top of each one of the posts B is a suitable bearing for a weighted lever H, which is provided with the counterbalance I at one end, and which is connected to the gate by suitable rods or connections at the other. The connections between the ends of the levers and the gate are preferably made as here shown, so as to allow the gate a free rising and falling movement; but I do not limit myself to any particular details of construction in this respect. The weights I are intended to be adjusted back and forth upon the ends of the levers in any suitable manner, so as to counterbalance the gate to any desired extent.

As the levers must have both a pivoted and a revolving movement, there is secured to each side of each lever at or near its center a board or strip J, and these are pivoted at their lower ends to a block L, which is provided with a pin on its under side to fit in one of the sockets C in the tops of the posts B. These blocks can revolve freely upon the posts at the same time that the strips or boards J allow the lever a free pivotal motion. This combined movement of the levers allows them to accommodate themselves to any movement of the gate as it rises and falls. When it is desired to keep the gate in a raised position, a rod O, which is loosely fastened to the under side of the outer end of one of the levers, is made to catch in the staple P upon the side of one of the posts B. This will keep the gate in a raised position and allow small stock to pass freely from one field to another; but when the rod is unfastened the gate instantly drops into position.

Having thus described my invention, I claim—

1. In a flood-gate, the posts B, supports extending therefrom, the gate, rods connected at their lower ends to the gate and pivotally connected at their upper ends to the outer ends of the supports, levers pivotally connected between their ends to the said posts, connections between the inner ends of the levers and the gate, and weights upon the outer ends of the levers, substantially as shown and described.

2. The posts or uprights having sockets in their upper ends, and the inclined supports secured to the inner sides of the posts, combined with the rods F, which are pivoted between them, the flood-gate secured to the lower ends of the rods, counterweighted levers mounted upon the posts and having a free universal movement, and suitable connections for attaching them loosely at one end to the gate, substantially as shown and described.

In testimony whereof I affix my signature in presence of two witnesses.

JOSHUA SHELLABARGER.

Witnesses:
HENRY NEWMAN,
J. J. MCLAUGHLIN.